United States Patent [19]

Hayashi et al.

[11] Patent Number: 4,536,357
[45] Date of Patent: Aug. 20, 1985

[54] METHOD AND APPARATUS FOR PREPARING MULTI-CELLULAR FOAMED BOARD OF THERMOPLASTIC RESIN

[75] Inventors: Motoshige Hayashi; Toshirou Kobayashi; Motokazu Yoshii, all of Nara; Masahiro Tsubone, Koga; Mikio Ishikawa, Oyama, all of Japan

[73] Assignee: Sekisui Kaseihin Kogyo Kabushiki Kaisha, Nora, Japan

[21] Appl. No.: 575,127

[22] Filed: Jan. 30, 1984

[30] Foreign Application Priority Data

Jan. 28, 1983 [JP] Japan .................................. 58-13406

[51] Int. Cl.$^3$ ............................................. B29D 27/00
[52] U.S. Cl. .................................. 264/53; 264/177 R; 264/DIG. 5; 425/461; 425/817 C
[58] Field of Search ............ 264/45.5, 51, 53, DIG. 5, 264/177 R; 425/461, 465, 807 C

[56] References Cited

U.S. PATENT DOCUMENTS

| 3,624,192 | 11/1971 | McCoy et al. ........................ 264/51 |
| 3,874,981 | 4/1975 | Hayashi et al. ................. 264/45.5 X |
| 3,897,528 | 7/1975 | Suh .................................... 264/53 X |
| 4,071,591 | 1/1978 | Kobayashi et al. ............ 264/45.5 X |
| 4,217,322 | 8/1980 | Sugano et al. .................. 425/461 X |

FOREIGN PATENT DOCUMENTS 54-65771 5/1979 Japan .

Primary Examiner—Philip Anderson
Attorney, Agent, or Firm—Armstrong, Nikaido, Marmelstein & Kubovcik

[57] ABSTRACT

A method for preparing a multi-cellular foamed board of thermoplastic resin which comprises forming under pressure in a die a thermoplastic resin melt containing a foaming agent to give the resin melt a shape of a flat board having a broad width compared with a thickness thereof, extruding the resin melt from the die having the convex forward end with a middle portion in the width direction thereof protruding the greatest toward the extruding direction, introducing thus extruded resin melt immediately into a moulding passage having a concave end engaging with the said convex forward end of the die, allowing the resin melt to expand in the thickness direction at the portion adjacent to and extending along the concave end of the passage, and thereafter allowing the resin melt to expand in both the thickness and width directions of the board in the passage.

14 Claims, 5 Drawing Figures

METHOD AND APPARATUS FOR PREPARING MULTI-CELLULAR FOAMED BOARD OF THERMOPLASTIC RESIN

BACKGROUND OF THE INVENTION

This invention relates to a process and apparatus for preparing multi-cellular foamed board of thermoplastic resin.

Various processes and apparatuses have been proposed for preparing a multi-cellular foamed board of thermoplastic resin. These proposals, however, generally are not satisfactory when they are used for preparing a multi-cellular foamed board having a large thickness and a broad width compared with the thickness. If a highly foamed board having a large thickness and broad width is desired having, for example, a thickness of more than 5 mm, a width of more than 20 times the thickness, and furthermore a density of less than 0.3 g/cc, preferably less than 0.1 g/cc, the processes and apparatuses hitherto proposed are inadequate. This is because, if it is tried to prepare by extrusion such a highly foamed board having such a large thickness and broad width, then the resulting board is either unevenly foamed or deformed or disfigured. A board uniformly foamed and having flat surfaces cannot be obtained.

For example, Japanese Patent Publication No. 39-5341 discloses a method for preparing a foamed board, which includes extruding a foamable resin from a die mounted on an extruder to form a flat board, passing the board through a pair of parallel plates to press the board between the plates and to maintain the board in a flat state, and allowing the board to foam freely in the width direction thereof to obtain the foamed board. By this method, however, it is difficult to obtain a foamed board having a broad width compared with a thickness thereof or a highly foamed board. This is because, if this method is used for preparing a broad board or a highly foamed board, the method is liable to give rise to cracks or to cause cells which were formed in the middle portion in the width direction of the board to be ruptured. The resulting board is weak in the middle portion thereof.

Japanese Unexamined Patent Publication No. 54-65771 proposes an extrusion method which includes mounting a specific shaped passage on the forward end of a die. The specific shaped passage is of a fan shape with the forward end protruding its middle portion in the width direction thereof toward the extruding direction and both sides progressively retreating away from the said middle portion. If the specific shaped passage is used, it is difficult to obtain a foamed board having a broad width compared with the thickness thereof or a highly foamed board having a low density. Especially, if this method is used for preparing the highly foamed board, the extruded board is further expanded and deformed while being passed through or after having been passed through the passage, and accordingly a foamed board cannot be obtained which has a shape just as desired.

Japanese Examined Patent Publication No. 43-17825 proposes an extrusion method which includes flattening a resin passage in a die to have a fan shape, thereafter bending the resulting passage perpendicularly to advance the foamable resin in the lateral direction, and extruding the resin through an orifice having the convex forward end. This method, however, cannot provide a foamed board of a large thickness. This is because, if the method is used for preparing a board of large thickness, then the extruded board is curved intricately in the width direction thereof and cannot be a flat board.

Japanese Examined Patent Publication No. 48-20786 proposes an extrusion method using a die having a convex forward end, in which an orifice is opened for extruding a resin. This Publication also proposes that curvature in the convex forward end should be varied according to density of a foamed board to be desired, particularly a radius of the curvature should be decreased when a highly foamed board of a low density is to be desired. Conversely, the radius should be increased when the board of a high density is to be desired. If, however, this method is used for preparing a board having a large thickness, the resulting board is intricately curved in the width direction thereof immediately after having been extruded from the orifice. Thus, a foamed board having an accurate shape as desired cannot be obtained.

OBJECTS AND SUMMARY OF THE INVENTION

It is an object of the present invention to provide an apparatus and method for producing a multi-cellular foamed board having a large thickness and a broad width compared with the thickness.

It is another object to provide a method and apparatus for producing such a board which is evenly foamed, has a desired shape with flat surfaces, has uniform strength, and is accurately dimensioned.

The inventors have now found that, in order to obtain a foamed board of large thickness, it is necessary to pass a foamable resin into a moulding passage immediately after the resin has been extruded from a die and to allow the resin to be foamed while being maintained in a flat state in the passage. Furthermore, the inventors have found that, in order to obtain the foamed board having a large thickness and a broad width compared with the thickness, it is necessary to use a die having a convex forward end, particularly, when viewed in the width direction of the board, the middle portion thereof protruding in the extruding direction and both sides retreating progressively away from the middle portion. Still further, the inventors have found that, when use is made of a die having a convex forward end, it is effective for obtaining a highly foamed board having a large thickness and a broad width when the rearward end (facing to the die) of the moulding passage is made concave so as to engage with the forward end of the die, and that the foamable resin is allowed to expand in the portion extending along the concave surface in the passage. The present invention has been completed on the basis of the above findings.

The present invention has as a main feature that a die has a convex forward end with the middle in the width direction of the board protruding the greatest in the extruding direction and with both sides of the middle retreating progressively rearwardly away from the middle, a further feature that a moulding passage has an inlet end facing to the die and is concavely shaped so as to engage with the forward end of the die, and a still further feature that a foamable resin is expanded in the passage in both the width and thickness directions of the board with expansion in the thickness direction being carried out at the portion close to and extending along the concave surface of the passage.

According to one aspect of the present invention there is provided a method for preparing a multi-cellular foamed board of a thermoplastic resin, and according to the other aspect of the present invention there is provided an apparatus for preparing the multi-cellular foamed board. The method comprises forming under pressure in a die a thermoplastic resin melt containing a foaming agent to give the resin melt a shape of a flat board having a broad width compared with a thickness thereof, extruding the resin melt from a die having the convex forward end with the middle portion in the width direction thereof protruding the greatest toward the extruding direction, introducing the extruded resin melt immediately into a moulding passage having a concave end engaging with the said convex forward end of the die, allowing the resin melt to expand in the thickness direction at the portion adjacent to and extending along the concave end of the passage, and thereafter allowing the resin melt to expand in both the thickness and width directions of the board in the passage.

The apparatus according to the present invention comprises an extruder, a die and a moulding passage, the die having at the resin discharge end thereof an orifice having a broad width with respect to a thickness thereof, the resin discharge end forming a convex surface which protrudes the greatest in the resin advancing direction at the middle portion in the width direction and retreats progressively away from the middle portion, the moulding passage having a resin passageway therein and a concave surface on the inlet side thereof, the resin passageway communicating with the orifice, the concave surface being engageable with the convex surface of the die so that the moulding passage is closely contacted with the convex surface of the die, and the resin passageway in the passage being enlarged at the portion close to and extending along the concave surface not only in the thickness direction but also in the width direction toward the resin advancing direction.

BRIEF DESCRIPTION OF THE DRAWINGS

The method according to the present invention is shown in FIGS. 1 to 5 in the accompanying drawings together with the apparatus used therein. In the drawings;

FIG. 1 is vertical cross-sectional view taken along I—I line of FIG. 2, and FIG. 2 shows a horizontal cross-sectional view take along II—II line of FIG. 1.

FIG. 3 is a vertical cross-sectional view taken along III—III line of FIG. 4, and FIG. 4 is a horizontal cross-sectional view taken along IV—IV line of FIG. 3.

DETAILED DESCRIPTION OF PREFERRED EMBODIMENTS

In FIGS. 1 to 5, numeral reference 1 denotes an extruder, 2 screw, 3 a die, 4 thermoplastic resin melt containing a foaming agent, 5 the forward end surface of die 3, 6a moulding passage, 7a gap, 8a second moulding passage which is to be added if desired; 9, 10 and 11 denote passages for heating or cooling medium provided in die 3, moulding passage 6 and second moulding passage 8, respectively; 12 denotes covering layer of a fluororesin, 13 a multi-cellular foamed board, and 14 take-up means.

Figure 1:
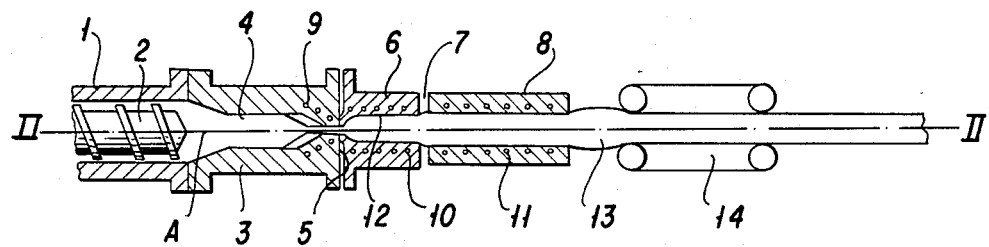
FIGS. 1 and 2 show a first embodiment, in cross section, of the present invention, particularly.
Figure 2:
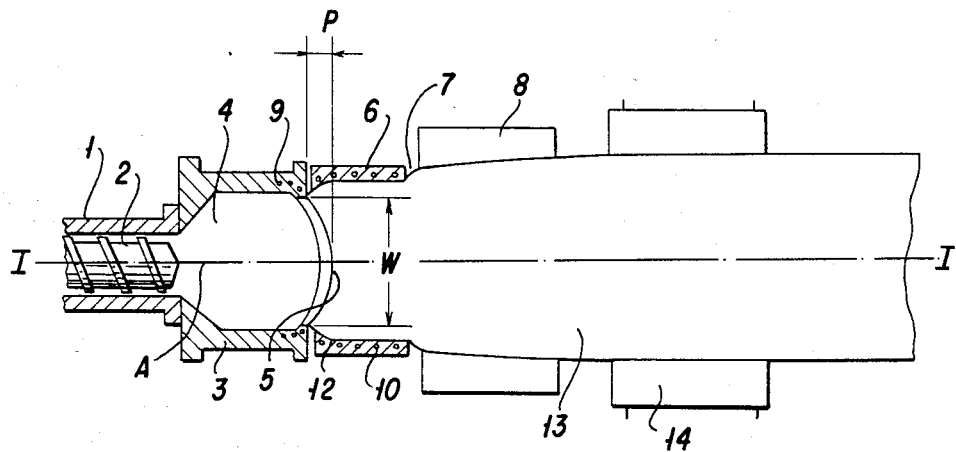

In FIGS. 1 and 2, a thermoplastic resin is heated in extruder 1 and impregnated with a foaming agent to form resin melt 4 containing foaming agent, which is forced into die 3 under pressure by screw 2 and advanced in die 3. Die 3 is provided with a resin passageway extending therethrough. The passageway has an annular cross section on the inlet side facing to extruder 1, but is flattened in the vicinity of the inlet side. Further, on the outlet side, the passageway is abruptly decreased in thickness direction and opens as an orifice laterally extending in a straight line.

The forward end 5 of die 3 forms a convex surface in which the middle portion in the width direction protrudes the greatest toward the advancing direction and the remaining portion retreats symmetrically and progressively away from the middle portion, when viewed in the width direction. Since the resin passageway is abruptly diminished in the thickness direction in the vicinity of the outlet, the diminishing portion is aligned in an arcuate form extending perpendicularly to the advancing direction of the resin. The convex surface extends in the form of an arc making as a center a point A in the die.

In FIGS. 1 and 2, moulding passage 6 is placed in contact with the forward end 5 of die 3. The surface of moulding passage 6 facing to die 3 is concavely shaped so as to be mated with the forward end 5 and can be closely contacted with the forward end 5 of the die. When the moulding passage 6 is closely contacted with forward end 5 of the die, the resin passageway in the moulding passage 6 can be communicated with the resin passageway in die 3 without any gap being formed therebetween with the entire periphery of the orifice in the die being completely surrounded by moulding passage 6. The resin passageway in moulding passage 6 is enlarged in the width direction at the portion adjacent to die 3, and therein also enlarged in the thickness direction, but enlargement in the thickness direction is made more abruptly than that in the width direction. The enlargement in the width direction is made in the portion extending along the concave surface. Rate of the enlargement in the thickness direction is normally larger than that in the width direction. Particularly, the rate of the enlargement in the thickness direction is 5–50, preferably 10–40, while, the rate of the enlargement in the width direction is 1.4–5, preferably 1.8–3.

The convex surface of the die and the concave surface of the moulding passage are varied according to properties of the foamed board to be desired. In general, the smaller the rates of the thickness to width of the foamed board, the larger must be a protruding rate of the convex of concave surface. Conversely, the larger the rates of the thickness to the width, the smaller the protruding rate. Further, the higher the foaming-up rate, the larger must be the protruding rate. The protruding rate referred to herein means a quotient, which is obtained by dividing the distance P by the width W in FIG. 2, wherein the distance P indicates the distance between the greatest protruding portion of the orifice in the die and the straight line connecting both ends in the width direction of the orifice, and wherein the width W indicates the length of the orifice in the width direction. The protruding rate is usually between 0.01 and 0.3, preferably 0.05–0.18.

In FIGS. 1 and 2, second passage 8 is provided beyond the moulding passage 6 leaving a small gap 7 therebetween. Second passage 8 is of such a structure that two simple flat plates are placed in a parallel relation, with their both sides remaining open forming a resin passageway of a uniform thickness between the plates. The second passage is arranged in a symmetric relation with respect of the axis extending in the advancing direction of the resin.

Passage 9 for passing a heating or cooling medium is provided in the portion adjacent to the forward end 5 in die 3. A heating or cooling medium is circulated in passage 9 while the resin is being extruded, and the forward end of the die is slightly heated or cooled. Moreover, passage 10 for passing the heating or cooling medium is provided in moulding passage 6, and while the resin is being extruded, the heating or cooling medium is circulated in passage 10. Furthermore, passage 11 for passing the heating and cooling medium is provided in second passage 8, and while extrusion is being carried out, the heating or cooling medium is circulated in passage 11.

Take-up means 14 is formed by a pair of opposing endless belts, which pinch and pull forward the resulting foamed board. Take-up means 14 serves to equalize the thickness of the board by pinching it between the belts and also serves to give the board a precisely flat shape.

In the embodiment shown in FIGS. 1 and 2, the foamed board is prepared in accordance with the steps mentioned below. A resin is charged in extruder 1 and heated to form a resin melt 4, which is impregnated with a foaming agent, thereafter forced into die 3 under pressure and therein formed into a flat shape having a broad width compared with a thickness thereof, and extruded from an orifice in the die. Thus extruded resin is immediately introduced into moulding passage 6, and is allowed therein to expand in both thickness direction and width direction thereof, thus foaming the resin. Since the forward end 5 of the die is of a convex surface protruding in the extruding direction when viewed in the width direction, while, the end of moulding passage 6 facing to the die is of a concave surface engageable with the said convex surface, and the moulding passage is placed in close contact with the die, the resin is allowed to expand in the portion extending along the concave surface of the moulding passage 6, and the expanded resin is advanced in moulding passage 6 while being restricted in both the thickness and width directions. While being advanced in the moulding passage 6, the resin is cooled. As the result, a resin board can be obtained which is highly foamed and has a large thickness and a broad width.

Figure 3:
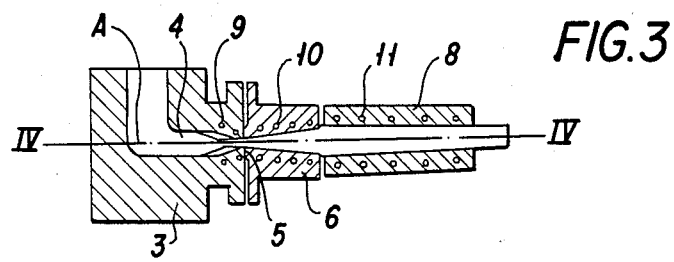
FIGS. 3 and 4 show a second embodiment, in cross section, of the present invention, particularly.
Figure 4:
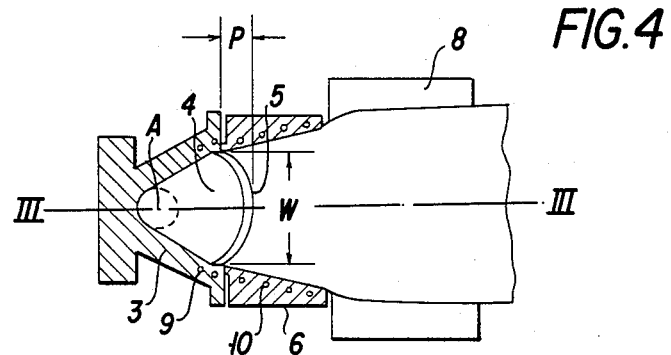

In the embodiment shown in FIGS. 3 and 4, resin is turned perpendicularly while being advanced in a die 3 and then extruded. The forward end 5 of die 3 is extending along an arc having as the center a point A in the die. In moulding passage 6, the resin passageway is enlarged in both the width and thickness directions over the entire passageway, and there is no portion wherein any enlargement is not made in the resin passageway. A rate of the enlargement in the thickness direction is bigger than that in the width direction. Second passage 8 is placed adjacent to moulding passage 6. Second passage 8 is also opened at both sides extending in the advancing direction. The present invention includes such apparatus as mentioned above and also various embodiments using such apparatus.

Figure 5:
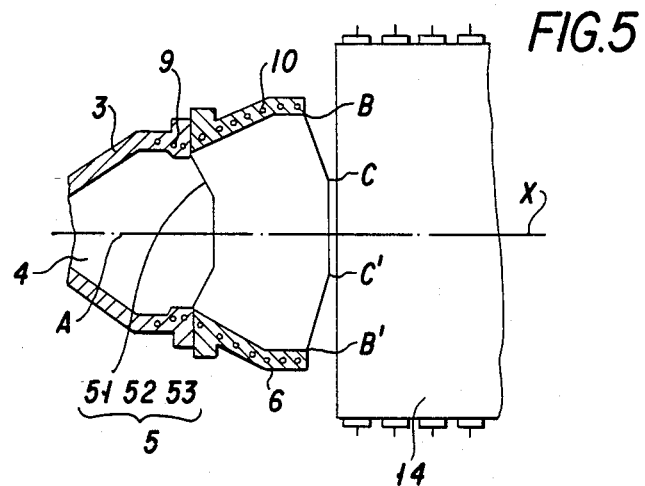
FIG. 5 is a horizontal cross-sectional view of a third embodiment of the invention.

In embodiment shown in FIG. 5, use is made of only die 3 and moulding passage 6, and the board passing through the moulding passsage is immediately taken up by means of take-up means 14, accordingly no use is made of such passage 8 as shown in FIGS. 1 to 4. Forward end 5 of die 3 is constructed of a plurality of flat planes, however, the end is convexed when viewed a a whole. More particularly, forward end 5 is formed by assembling flat planes BC, CC' and C'B', each of which joins two points B, B', C, C', all of which are at an equal distance from center A on center line X, by rounding all edges between said planes. The present invention includes the above apparatus and also a method using the apparatus.

Take-up means 14 in FIG. 5 is formed by a pair of endless belts, each of which is supported by a number of rolls and designed to form a uniform gap between itself and the other.

In the present invention, the forward end of the die is made of a convex surface protruding toward the extruding direction when viewed in the width direction. Thus while the resin is pased through the die and is flattened therein, the resin is advanced in an equal path at the middle and at the both ends in the width direction, and extruded as a uniform resin stream having a broad width. The extruded resin is immediately introduced into the moulding passage, wherein the resin is allowed to expand in both the thickness and width directions. Furthermore, expansion of the resin in the thickness direction is commenced at the portion extending along and close to the concave surface in the moulding passage, and therefore the expansion in the thickness direction is carried out uniformly over the entire width. Moreover, since the expansion of the resin is carried out under restrictions of both width and thickness directions, the resin does not give rise to any objectionable deformation, and therefore a uniformly foamed board can be obtained which is evenly foamed in the thickness and width directions. Accordingly, a highly foamed board of a large thickness and a broad width can be obtained which has a thickness of more than 5 mm, a width of more than 20 times the thickness, and a density of less than 0.3 g/cc, preferably a density between 0.1 and 0.02 g/cc.

Following examples serve to illustrate the method and apparatus according to the present invention:

EXAMPLE 1

This example was conducted in the below-mentioned manner using the apparatus as shown in FIGS. 1 and 2.

Use was made of a die in which the resin discharge end protruded, as shown in FIG. 2, in the form of an arc having the width W of 188 mm (horizontal, straight line length from end to end of the arc) and distance P of 30 mm (protruding length of the middle portion of the arc from the straight line joining both ends of the arc). The resin passageway in the die had on the resin discharge end the width of 188 m, which was equal to said W, the thickness of 0.8 mm, and the land length was 5 mm. The arc had 200 mm in length measured along the resin discharge end 5. The arc was a part of the circle centering the point A and had radius of 164 mm and a center angle of 70°.

Moulding passage 6 had on the inlet side thereof a concave surface engageable with the above-mentioned convex end, and was provided with an orifice on the said concave surface. The orifice had an arc length of 202 mm and a thickness of 2 mm. The resin passageway in the moulding passage was enlarged in the width and thickness directions in the vicinity of the entrance thereof. Particularly, as to the thickness direction, the resin passageway was abruptly enlarged in the vicinity of the entrance until 9 mm in thickness, and thereafter advanced to the exit with the same thickness of 9 mm. While, as to the width direction, the passageway was abruptly enlarged in the vicinity of the entrance and thereafter also enlarged gradually over the whole length until the exit, wherein the width was rendered 380 mm. The moulding passage 6 had at the exit end a flat plane perpendicular to the extruding direction. The moulding passage 6 was provided with the resin passageway having the length of 60 mm along the resin advancing direction, when measured at the middle point in the width direction. Wall surfaces of the resin passageway were covered with a tetrafluorocarbon resin to make it easy for the foamable resin to slide over the surfaces.

Second passage 8 was provided at the distance of 10 mm from moulding passage 6. Second passage 8 was formed by simply placing two flat plates in a mutually opposing and parallel relation with each of the plates having a width of 1000 mm and a length of 600 mm. The plates formed a space of 11 mm in the thickness direction therebetween. Wall surfaces to be contacted with the foamed resin were covered with tetrafluoroethylene to make it easy for the resin to slide over the surfaces.

For thermoplastic resin, use was made of polystyrene, and for the foaming agent use was made of a mixture of dichlorodifluoromethane and methyl chloride, each mixed in an equal amount by weight. More particularly, 1.5 parts by weight (hereinafter it is referred to simply parts) of powdery talc, acting as a cell nucleating agent, was mixed with 100 parts of polystyrene, and the resulting mixture was charged in an extruder, wherein the mixture was heated up to 200° C. to form resin melt, into which said foaming agent was injected to form a foamable resin. Forward end of the extruder was maintained at 122° C., and the foamable resin was extruded from the said die at the rate of 40 kg/hr. Thus a multicellular foamed board could be obtained having the thickness of 13 mm and width of 435 mm.

The board was evenly foamed to have microglobular cells therein, flat surfaces of excellent appearance and a uniform thickness throughout the board. Further, the board had the density of 40 kg/m$^3$, which was as desired. Moreover, in order to investigate partial density of various parts of the board, the board was cut into five equal parts in the width direction thereof, the parts were numbered from 1 to 5 in order from one end, and thickness and density were measured of each part. The measured results are listed in Table 1, and from the results it was confirmed that the board was uniformly foamed. Moreover, as to the parts No. 1 and No. 3, the force required for decreasing thickness of each part by 3 mm was measured to investigate partial compressive hardness, and the results are listed in Table 2. From the results it was confirmed that the board was uniformly foamed.

COMPARATIVE EXAMPLE 1

In this Comparative Example, a foamed board was prepared in the same manner as in Example 1, except that the forward end of the die was not made as a convex surface but as a flat surface perpendicular to the resin advancing direction, and accordingly the inlet end of the moulding passage to be contacted with the forward end of the die was also made flat. The resin passageway was opened on the forward end of the die as an oblong orifice having the width of 200 mm and thickness of 0.8 mm, and land length was 5 mm. The moulding passage had on the exit side a flat surface perpendicular to the resin advancing direction, and also had a resin passageway therein. The resin passageway had the width of 200 mm and the thickness of 2 mm at the entrance, and thereafter the thickness was abruptly enlarged to 9 mm, and thickness of 9 mm extended to the exit, while in the width direction, the passageway was abruptly enlarged in the vicinity of the entrance and thereafter enlarged gradually to 380 mm in width at the exit. Use was made of the same second passage as used in Example 1. In the moulding passage, wall surfaces to be contacted with the foamable resin melt were covered with tetrafluoroethylene to make it easy for the resin to slide over the surfaces.

By means of the same foamable resin, die, moulding passage and second passage as those used in Example 1, procedures were repeated in the same way as in Example 1 to obtain a foamed board. The board had a uniform width of 400 mm but ununiform thickness ranging from 13 mm to 15.3 mm. Cells in the board were flattened at the middle portion of the thickness as if they had been pressed in the thickness direction, and the cells at the middle portion gave soft feeling when touched with fingers, thus the board was found as being ununiformly foamed. The board was cut into five equal parts in the same manne as in Example 1, and density and thickness were measured of each of the parts. The resulting values are listed in Table 1 and 2, and it was confirmed that the board was ununiformly foamed.

TABLE 1

| | | Part No. | | | | | Average | Deviation |
|---|---|---|---|---|---|---|---|---|
| | | 1 | 2 | 3 | 4 | 5 | | |
| Example 1 | Thickness (mm) | 13.2 | 13.0 | 13.1 | 12.9 | 13.0 | 13.0 | 0.3 |
| | Density (kg/m$^3$) | 39.8 | 40.1 | 40.2 | 40.1 | 39.8 | 40.0 | 0.4 |
| Comparative Example 1 | Thickness (mm) | 13.3 | 14.2 | 15.3 | 14.4 | 13.0 | 14.0 | 2.3 |
| | Density (kg/m$^3$) | 43.0 | 41.5 | 39.1 | 41.2 | 42.3 | 41.4 | 3.9 |

TABLE 2

Partial Compressive Hardness (kg/2 mm$^2$)(when decreaded by 3 mm)

| | No. 1 | No. 3 | Deviation |
|---|---|---|---|
| Example 1 | 15.6 | 15.4 | 0.2 |
| Comparative Example 1 | 14.9 | 11.0 | 3.9 |
| Example 2 | | | |

In this example use was made of a mixture of polypropylene and high density polyethylene for the resin to be foamed, and use was also made of an apparatus having such a structure as shown in FIGS. 3 and 4. The resin extruded from an extruder was entered and advanced in a die, wherein the resin advancing direction was turned perpendicularly, and then was extruded from the die.

Die 3 had forward end 5 protruding in extruding direction in the form of an arc, which extended, as shown in FIG. 4, to have a width W of 193 mm and a protruding distance P of 23 mm. The orifice opened on the forward end 5 and a width of 193 mm, which was equal to the width W, and a thickness of 0.4 m, and had a land length of 5 mm. On the forward end 5, the arc had 200 mm in length when measured on the convex surface, and the arc was a part of the circle centering point A, making a radius of 216 mm, and forming a center angle of 53°.

Moulding passage 6 had on inlet side thereof a concave surface, which was to be engaged with the forward end 5. The moulding passage 6 had therein a resin passageway, which was opened on the inlet end to form an orifice equal to that on the forward end 5 of the die, enlarged in the width and thickness directions in the vicinity of the inlet end. Enlargement in the width and thickness directions as stretched to the exit with a slight gradient. The moulding passage had on the exit side a flat plane perpendicular to the extruding direction, and on the plane had an orifice in the form of an oblong of 10 mm in thickness and 260 mm in width. The resin passageway had the length of 60 mm in the extruding direction as measured along the axis of the moulding passage.

Second passage 8 was set in close vicinity of the moulding passage 6. Second passage 8 was made by simply placing in a parallel and opposing relation two plates having a width of 500 mm and a length of 300 mm to leave therebetween a gap having a thickness of 10 mm on the inlet side and 6 mm on the exit side thereof, wherethrough the foamed resin was passed. Wall surfaces of the resin passageway in moulding passage 6 and second passage 8 were covered with fluororesin to make it easy for the foamable resin to pass through the passageway.

Use was made of a mixture of 100 parts by weight of polypropylene, 10 parts by weight of high density polyethylene, and 0.5 parts by weight of fine powdery talc acting as a cell nucleating agent. The mixture was charged in an extruder, wherein it was melted at 230° C. and impregnated with butane under pressure to form a foamable resin containing 5% by weight of butane. A cooling means was provided at the forward end of the extruder, and the foamable resin was extruded from the die at 160° C. in a rate of 10 kg/hr. The die was maintained at 165° C., and oil at 130° C. was circulated in passageway 9 of the die to cool the forward end of the die. Further, oil at 100° C. was circulated in passageway 10 of moulding passage 6. Outer surface of second passage 8 was cooled by the air.

Thus a foamed board could be continuously obtained having the thickness of 7 mm and the width of 250 mm. The board had a precise cross section as desired, was uniformly foamed and contained fine microcells therein, had pretty, flat and smooth outer surfaces, a high surface hardness, and a density 200 kg/m$^3$.

EXAMPLE 3

In this Example, procedures were repeated in the same manner as in Example 1, except that use was made of a mixture of polypropylene and polystyrene for the resin to be foamed, and also made of different moulding and second passages.

The moulding passage was set in close contact with the forward end of a die. Resin passageway in the moulding passage was opened on the inlet side thereof to form an orifice having the same form as that of the die, and was enlarged in the vicinity of the inlet in both the width and thickness directions and thereafter enlargement was continued with a slight gradient to the exit of the moulding passage. The exit end of the moulding passage was made of a flat plane perpendicular to the extruding direction, and the resin passageway was opened on the flat plane to form an orifice having the thickness of 12 mm and width of 300 mm. The passageway was extended in 80 mm in length as measured along the axis of the moulding passage.

Use was made of two same plates as used in Example 1 for forming the second passage, however, the plates were set to form an inclined gap having the distance of 12 mm on the inlet side and the distance of 10 mm on the outlet side of the plates.

Use as made of a mixture of 100 parts by weight of polypropylene and 20 parts by weight of polystyrene, whereto 1.0 parts by weight of fine powdery talc was added and intimately mixed. The resulting mixture was charged into an extruder heated up to 230° C. to form a resin melt, which was impregnated with butane under pressure while being advanced in the extruder, and as the result a foamable resin was formed containing 12% by weight of butane. A cooling means for the resin melt was interposed between the forward end of the extruder and the die to cool the resin melt down to 158° C., and the resin was then extruded from the die at the rate of 10 kg/hr. The die was maintained at 160° C., oil at 120° C. was circulated in the passageway 9 of die to cool the forward end of the die. Oil at 90° C. was circulated in passage 10 of the moulding passage to cool it.

As the result a foamed board could be obtained without difficulty which had the thickness of 10 mm and the width of 300 mm. The foamed board was uniformly foamed and containe fine microcells therein; had pretty, flat and smooth outer skin, and accordingly excellent as the foam. The board had a density of 40 kg/m$^3$.

It is readily apparent that the above-described method and apparatus meet all of the objects mentioned above and also have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method for preparing a multi-cellular foamed board of thermoplastic resin which comprises forming under pressure in a die a thermoplastic resin melt containing a foaming agent to give the resin melt a shape of a flat board having a broad width compared with a thickness thereof, extruding the resin melt from the die having the convex forward end with a middle portion in the width direction thereof protruding the greatest toward the extruding direction, introducing thus extruded resin melt immediately into a moulding passage having a concave end engaging with the said convex forward end of the die, allowing the resin melt to expand in the thickness direction at the portion adjacent to and extending along the concave end of the passage, and thereafter allowing the resin melt to expand in both the thicknes and width directions of the board in the passage.

2. The method of claim 1 wherein the multi-cellular foamed board has a thickness of more than 5 mm, a width of more than 20 times the thickness, and a density of less than 0.3 g/cc.

3. The method of claim 2 wherein the density is between 0.1 and 0.2 g/cc.

4. The method of claim 1, wherein the resin is polystyrene.

5. The method of claim 1, wherein the resin is a mixture of polypropylene and high density polyethylene.

6. The method of claim 1, wherein the resin is a mixture of polypropylene and polystyrene.

7. The method of claim 1 further comprising introducing the expanded resin melt into a second passage positioned at a small distance from said pasages, said second passage being defined by two parallel planes arranged in symmetric relation with respect to the axis extending in the avancing direction of the resin.

8. In a method of preparing a low density foamed board of a thermoplastic resin by extruding a foamable resin from a die mounted on an extruder and passing through a moulding passage, an improvement which comprises forming the foamable resin to have a flat shape in the die, extruding thus flattened resin from the die having a convex foward end extending in the width direction of the flat shape, introducing the extruded resin immediately into the moulding passage wherein the foamable resin is allowed to commence foaming primarily in the thickness direction at a portion adjacent to and extending in the convex forward end, and then allowing the resin to be foamed in both the thickness and width directions in the moulding passage.

9. An apparatus for preparing a multi-cellular foamed board of thermoplastic resin which comprises an extruder, a die and a moulding passage, the die having at the forward end thereof an orifice having a broad width with respect to a height thereof, the forward end forming a convex surface which protrudes the greatest in the resin advancing direction at a middle portion in the width direction and retreats progressively away from the middle portion, the moulding passage having a resin passageway therein and a concave surface on the inlet side thereof, the resin passageway communicating with the orifice, the concave surface being engageable with the convex surface of the die so that the moulding passage is closely contacted with the convex surface of the die, and the resin pasageway in the passage being enlarged at a portion close to and extending along the concave surface in the thickness direction and in the width direction toward the resin advancing direction.

10. The apparatus of claim 9, wherein the enlargement of the resin passageway in the thickness direction is more abrupt than in the width direction.

11. The apparatus of claim 10, wherein a rate of enlargement in the thickness direction is from 5 to 50.

12. The apparatus of claim 11 wherein the rate of enlargement is from 10 to 40.

13. The apparatus of claim 10 wherein a rate of enlargement in the width direction is from 1.4 to 5.0.

14. The apparatus of claim 13, wherein the rate of enlargement is from 1.8 to 3.0.

* * * * *